Figure 1:
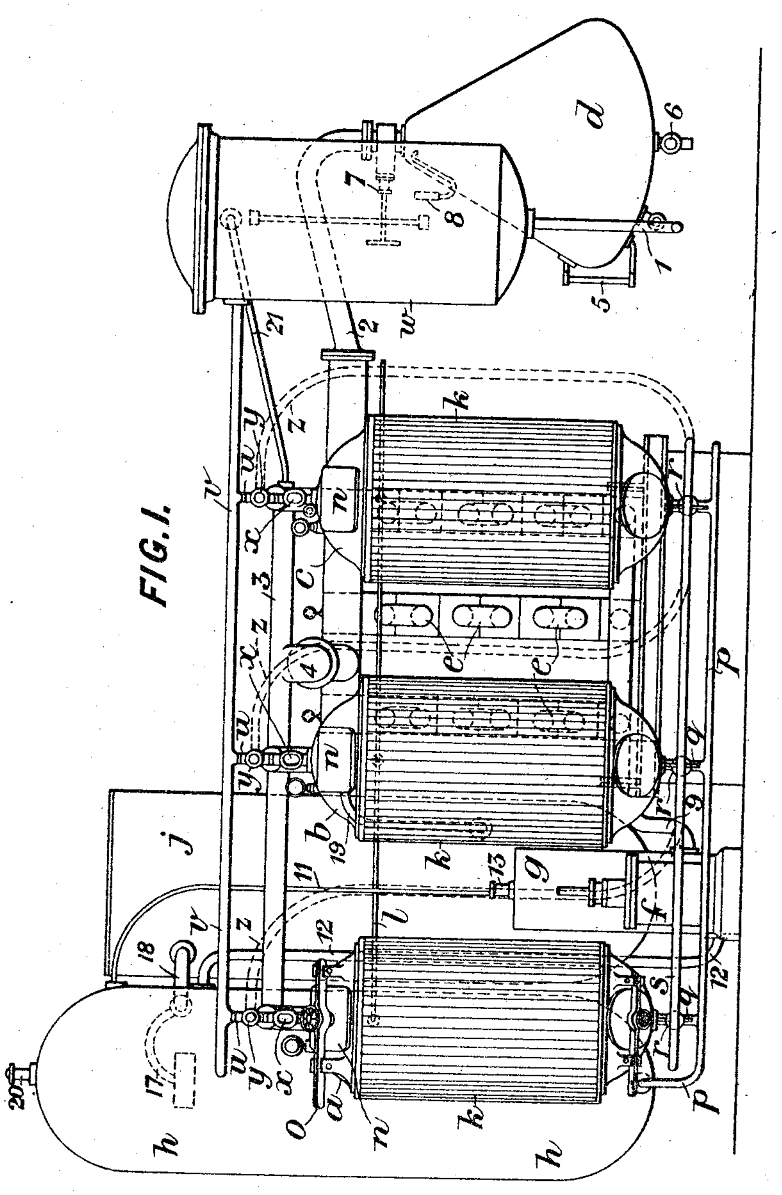

C. R. MAYO.

METHOD OF THE EXTRACTION OF GREASE AND SIMILAR MATTER FROM WOOL, SKINS, TEXTILES, AND OTHER MATERIALS.

APPLICATION FILED MAY 23, 1912.

1,067,357. Patented July 15, 1913.

3 SHEETS—SHEET 1.

Witnesses:
R.W. Sommers
E. Leckert.

Inventor.
Charles R. Mayo.
By Henry Orth Jr.
Atty.

C. R. MAYO.

METHOD OF THE EXTRACTION OF GREASE AND SIMILAR MATTER FROM WOOL, SKINS, TEXTILES, AND OTHER MATERIALS.

APPLICATION FILED MAY 23, 1912.

1,067,357.

Patented July 15, 1913.

3 SHEETS—SHEET 2.

Witnesses:
R. W. Sommers
E. Leckert.

Inventor,
Charles R. Mayo
By Henry Orth Jr
Atty.

C. R. MAYO.

METHOD OF THE EXTRACTION OF GREASE AND SIMILAR MATTER FROM WOOL, SKINS, TEXTILES, AND OTHER MATERIALS.

APPLICATION FILED MAY 23, 1912.

1,067,357. Patented July 15, 1913.

3 SHEETS—SHEET 3.

Witnesses:
B. Dommers
E. Leckert.

Inventor
Charles R. Mayo
By [signature] Atty.

UNITED STATES PATENT OFFICE.

CHARLES ROBERT MAYO, OF LONDON, ENGLAND.

METHOD OF THE EXTRACTION OF GREASE AND SIMILAR MATTER FROM WOOL, SKINS, TEXTILES, AND OTHER MATERIALS.

1,067,357. Specification of Letters Patent. Patented July 15, 1913.

Application filed May 23, 1912. Serial No. 699,250.

*To all whom it may concern:*

Be it known that I, Charles Robert Mayo, a subject of the King of Great Britain, residing at Alderman's House, Bishopsgate, in the city of London, England, have invented a new and useful Improved Method of Extraction of Grease and Similar Matter from Wool, Skins, Textiles, and other Materials, of which the following is a specification.

This invention relates to an improved method of extraction of grease or oil and similar matter from wool, skins, textiles, seeds and other materials.

According to the invention which is the subject of a prior application filed April 8, 1910, Ser. No. 554,176, the grease-laden solvent, or the emulsion as it may be termed, was displaced and caused to overflow from the upper end of a separator or extractor into a still, any vapors from the separator and still being conducted into a condenser in which reduced pressure or vacuum was maintained, so that the suction acting through the condenser, maintained a low pressure or vacuum also in the separator or extractor and in the still. Further the delivery from the suction pump was led into a compression chamber which facilitated the condensation of vapors still retained by the air or gases discharged by the pump. The fluids delivered from the compression chamber were finally passed into a scrubbing vessel for the complete recovery of the last traces of solvent not deposited in the compression chamber.

Now the present invention has chiefly for its object to provide a modified arrangement or alternative disposition of the pump and compression chamber and also if desired of the reservoir, whereby improved results and greater efficiency may be attained.

A further object is to reduce the time occupied for the grease solvent to rise up through, for example, heavy and close materials to be degreased, such as cotton waste. In the arrangement described in my previous application the solvent was forced upward through the material under a pressure due to the head of liquid in the reservoir and in the improved arrangement this pressure may be increased by maintaining a gaseous pressure over the column of liquid in the reservoir.

According to this invention the suction pump and the compression chamber, into which the pump delivers the gases and vapors withdrawn from the condenser, still and degreasing vessels, are both arranged between the condenser and the reservoir so that the whole of the products of condensation and vapors from the condenser pass through the pump and compression chamber. The latter acts not only to assist condensation of the remaining vapors of solvent but also as a sort of trap for the liquids separated from the vapors and gases and is connected so as to return the liquid to the reservoir and the vapors and gases to a scrubber either directly or indirectly by way of the gas or air space in the reservoir.

It is sometimes advantageous to arrange for a circulation of water or scrubbing liquid to take place through the condenser and this is conveniently accomplished by connecting the scrubbing vessel with the condenser as hereinafter described.

In order to enable this invention to be readily understood reference is made to the accompanying more or less diagrammatic drawings in which:—

Figure 2:
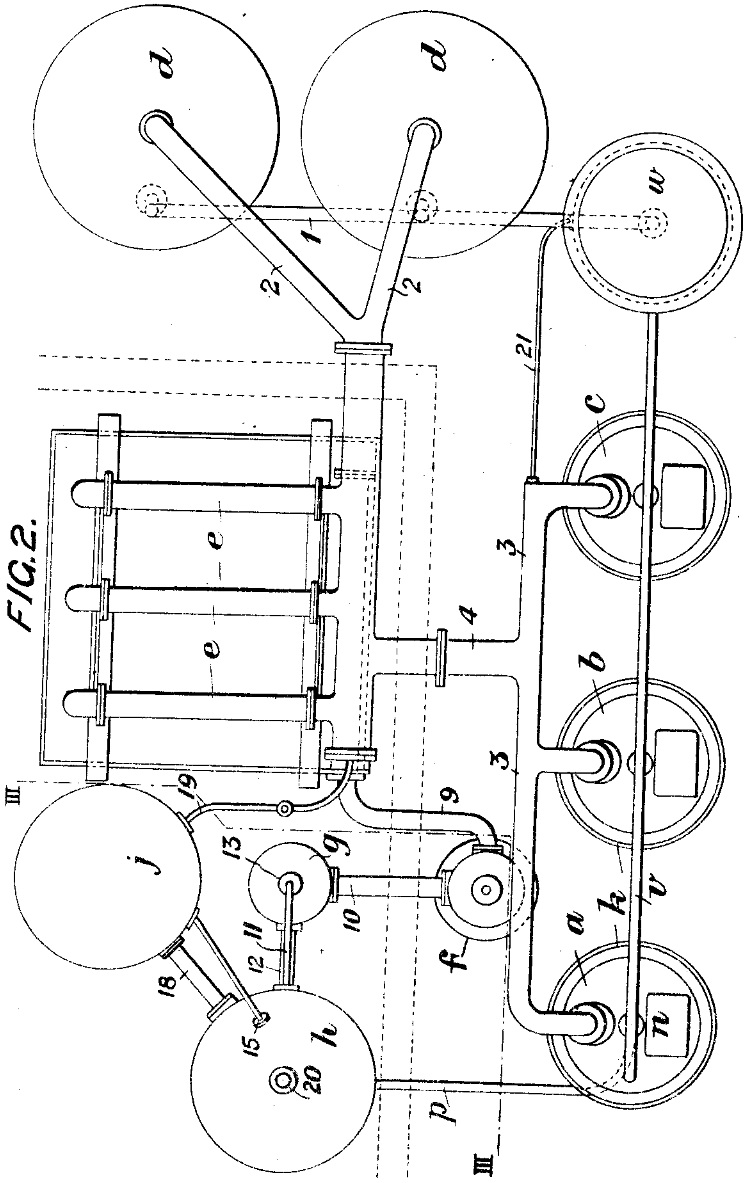
Figure 3:
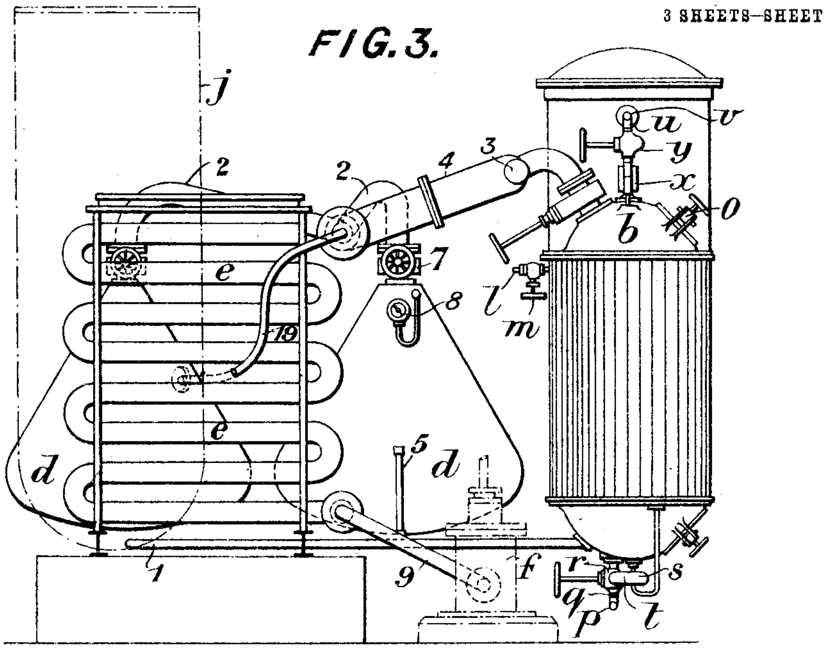
Figures 4, 5, 6:
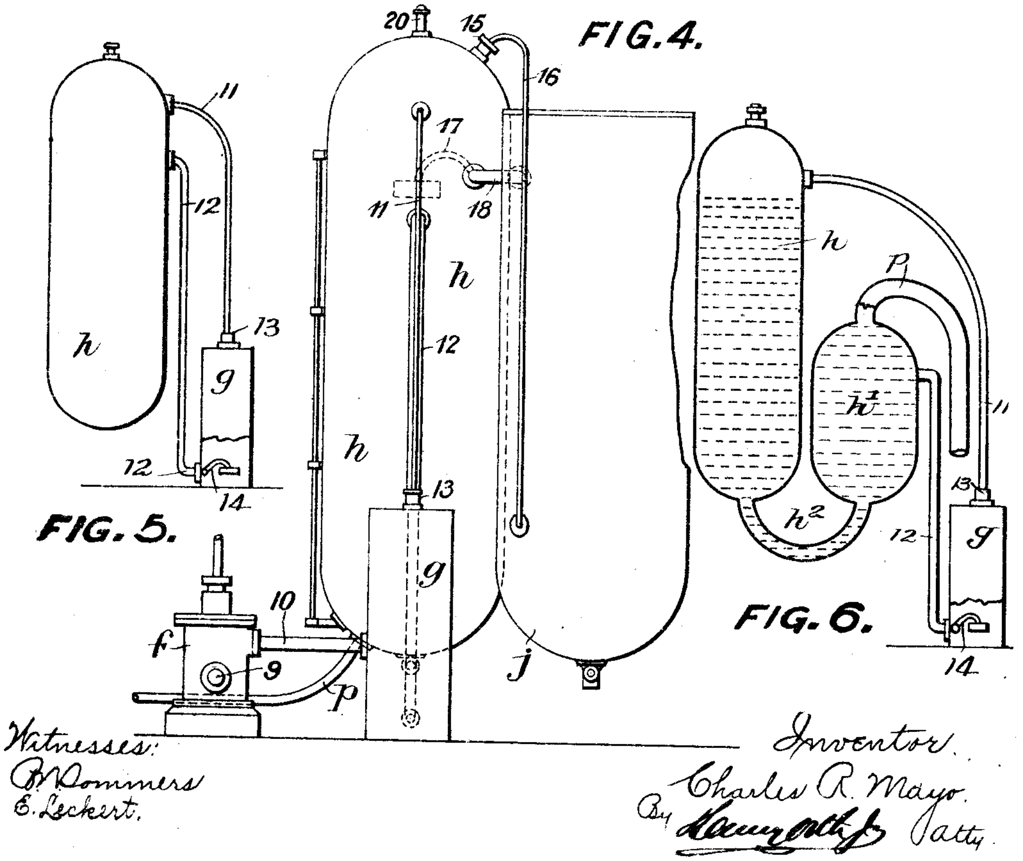

Figure 1 is a side elevation of a degreasing plant comprising the novel construction and arrangement for carrying out the process according to the present improvements. Fig. 2 is a plan of Fig. 1. Fig. 3 is an elevation, showing pieces of apparatus situated to the right hand side of the line III—III of Fig. 2, the elevation showing the apparatus as viewed from the left hand side of Fig. 1, and Fig. 4 is an elevation showing pieces of apparatus situated to the left hand side of the line III—III of Fig. 2. Fig. 5 is an elevation of the reservoir and compression chamber and Fig. 6 is a diagrammatic view of a modified form of reservoir.

The plant illustrated in the drawings is, generally speaking, similar to that described in the specification of the said prior application, as it comprises three degreasing vessels or separators *a* *b* and *c*, a still or stills *d*, a condenser *e*, a pump *f*, a compression chamber or air vessel *g*, a reservoir *h* and a scrubber *j* which suitably takes the form of a vertical cylinder containing a column of water or other suitable liquid.

The degreasing vessels *a* *b* *c* are fitted with jackets *k* which may be supplied with a heating medium such as steam or hot water through the pipe *l* under the control of the respective cocks *m* Fig. 3. The material to be deprived of grease is introduced into the degreasing vessels, for example by way of openings which are tightly closed during the operation by the doors *n*, or the covers of the vessels *a b* and *c* may be removable to allow of such introduction. When the doors *n* are employed, suitable fastening means, such as that indicated by the reference letter *o* on the vessel *a* in Fig. 1 and in Fig. 3, are provided for readily tightening the doors on to their seats, or for loosening them, as will be readily understood.

The solvent for the grease or oil is supplied from the reservoir *h* by a pipe *p*, the branches *q* leading from the pipe *p* to the respective vessels *a b c* being fitted with valves *r*, so that upon opening any valve *r*, the solvent rises into the corresponding vessel and fills the latter and removes the grease from the material contained in that vessel. Further admission of solvent through the valve *r* displaces the grease-laden solvent through upper pipe connections hereinafter described and when the grease has been removed, which is indicated by the solvent passing away from such upper connections in a clean condition, it becomes necessary to empty the degreasing vessel in question of the solvent which it contains. For this purpose a pipe *s* may be connected to the lower ends of the degreasing vessels by branches *t*, Fig. 3, advantageously connected to the valves *r*, which may be of the three-way variety, so that a single valve *r* enables communication to be opened either between a degreasing vessel *a*, *b* or *c* and the supply pipe *p*, or between the same vessel and the pipe *s* which would thus allow the solvent contained in one degreasing vessel to be discharged from the latter through the pipe *s* into another vessel.

At the upper ends of the degreasing vessels branch connections *u* are fitted leading to a common overflow pipe *v*. Each branch may be fitted with a sight window *x* and with a shut off cock *y*. The cocks *y* may be of the three-way variety and pipes *z* may be connected between the casings of these cocks and the pipe *s*, so that by adjusting any cock *y* the displaced solvent overflowing from the corresponding vessel may be led either to the lower end of another vessel, by the pipe *z*, or may be led away for distillation by the pipe *v*.

By closing any cock *y* and admitting steam to the jacket of the corresponding vessel, and by adjusting the cock *r* of that vessel and the cock *r* of a neighboring vessel, the pressure generated in the heated vessel, due to evaporation of the solvent, will drive the solvent from the heated vessel through its cock *r*, through the pipe *s*, and into the other degreasing vessel whose cock *r* is opened. The dirty, or grease-laden solvent from any vessel is conducted away for distillation by the pipe *v*. The pieces of apparatus and mode of interconnecting the degreasing vessels described up to this point are very similar to corresponding pieces of apparatus and the mode of interconnecting the vessels described in the said prior application.

Between the still or stills *d* and the degreasing vessels *a b c*, a filter *w* of any suitable construction may be inserted and the pipe *v* may be arranged to deliver the overflowing solvent into the filter *w* at the upper end of the latter, the solvent passing away at the lower end by the pipe *l* into one or other of the stills *d*, if more than one still is employed. Or the filter may be arranged to deliver into both stills simultaneously.

The filter *w* may simply consist of a cylindrical vessel in which is suitably supported a canvas bag or strainer through which the solvent is passed, the bag or strainer retaining small pieces of cotton, wool, or fiber, or earthy matter, or sand which may have been carried over by the grease-laden solvent.

The still or stills *d* is or are connected by pipes 2 with the condenser *e* and the degreasing vessels may be connected each at its upper end with a suction main 3 connected with the condenser by a pipe 4. Suitable sight tube gage glasses 5 and draw off cocks 6 may be fitted to the stills and to any other vessel where required. Also steam heating coils or devices are fitted to the stills as required. Delivery valves 7 and pressure gages 8 are shown fitted to the stills *d* in Figs. 1 and 3.

The present improvements provide, according to one convenient arrangement, for the connection of the suction pipe 9 of the pump *f* to the condenser *e* and for the connection of its delivery pipe 10 to a point preferably near to the foot of the vertical cylindrical air vessel *g* which constitutes the compression chamber. The top of this chamber *g* is connected by a pipe 11 with the top of another but preferably larger cylindrical vessel *h* which serves as the reservoir, while a second pipe connection 12 runs from near the bottom of the compression chamber *g* to a point near to the top of the reservoir *h*. The outlet from the top of the compression chamber may be controlled by a loaded or blow off valve 13 which is adjusted to produce a suitable pressure in the compression chamber *g*. When this pressure is exceeded the valve 13 opens and air or gases with traces of vapors carried thereby are conveyed through the pipe 11 into the space in the reservoir *h* above the surface of the liquid contents thereof. The lower outlet from the compression chamber $g$ may be controlled by a float valve 14 so that when sufficient liquid collects in the compression chamber $g$, the float is raised [illegible] ing the valve and, as the pressure in the compression chamber is greater than [illegible] sure in the reservoir, the liquid [illegible] the lower part of the compression [illegible] is forced up through the pipe [illegible] reservoir. There are [illegible] from the reservoir [illegible] thereof, the one being [illegible] let valve or blow off valve [illegible] justed to open at any [illegible] is connected by a pipe [illegible] end of a vessel containing water, [illegible] suitable scrubbing liquid, and the [illegible] let being controlled by a float valve [illegible] permits excess of the water which [illegible] upon and seals the heavier solvent in the reservoir $h$ to pass over through the pipe [illegible] into the scrubbing vessel $j$.

A pipe 19 may be connected between the scrubbing vessel $j$ and the inlet end of the condenser, so that a small stream of water or liquid will constantly flow from the scrubbing vessel $j$ into and through the [illegible] and this water or liquid seals the liquid solvent, when the latter is heavier than water, in the pump $f$ and air vessel [illegible] and also washes all traces of solvent out of the condenser $e$. A blow off valve 20 is preferably fitted to the reservoir and is arranged to blow off at, say, 10 lbs. to the square inch, so that in the event of the valve [illegible] not [illegible] ing properly safety will be insured by the blowing off of the valve 20.

A pipe 21 may be connected between the pipe 8 and the filter $w$ for the purpose of insuring reduced pressure or vacuum in the filter.

The mode of conducting the degreasing of material in the vessels $a$ $b$ and $c$, passing the grease-laden solvent to the stills $d$, and condensing the distillates, may be very similar to that which is described in the prior application aforesaid, the pump [illegible] reduced pressure in the condenser [illegible] also in the separator or separators [illegible] and in the still $d$. According to these improvements, however, the water, condensed solvent, air or gases and vapors are [illegible] by the pump $f$ from the condenser [illegible] forced by the pump $f$ into the compression vessel $g$, the outlet from which is so adjusted that a pressure is set up therein. The vapor tension may be thus reached and most of the uncondensed solvent vapors will be condensed and deposited in the form of [illegible]. As soon as the gaseous pressure in the compression vessel $g$ exceeds the pressure for which the blow off valve 13 is loaded, the air or gas in excess of that required for maintaining the desired pressure passes up the pipe 11 into the free space in the reservoir $h$ and when the accumulation in such space attains a pressure sufficient to open the loaded valve [illegible] the reservoir $h$, which pressure [illegible] much less than the pressure in the compression vessel [illegible] passes from the [illegible] [illegible] the condenser $e$. The [illegible] the liquid in the reservoir [illegible] the valve is added [illegible] due to the head of [illegible] due to [illegible] above [illegible] pressure [illegible] forcing the [illegible] the material to be [illegible] the solvent can be made to pass up through even tightly rammed and [illegible] material such as oily cotton waste in the degreasing vessels $a$ $b$ and $c$ in a comparatively short space of time.

[illegible] a pipe from the top of the [illegible] may be connected [illegible] permanently with the [illegible] so that the air and vapors in the compression vessel can be taken direct to the scrubber, only the liquid pipe at the bottom of the compression vessel would under such circumstances be connected to the reservoir, and the space above the water in the reservoir might be maintained at atmospheric pressure, or, if reduced pressure were [illegible] of the pipes connecting the reservoir [illegible] might be dispensed with and the [illegible] above the reservoir might be [illegible] by a pipe to the suction side of the pump.

[illegible] the apparatus is intended for use [illegible] solvent which is lighter than water [illegible] general principles apply as here-[illegible] described but the reservoir is modified [illegible] for example and as shown in Fig. 6 the reservoir may be U shaped as for example by connecting two vessels $h$ $h'$ by a pipe bend $h^2$ with the limb $h'$ shorter than the other. The short limb $h'$ contains the solvent which is delivered from the upper end of this short limb to the solvent supply main $p$, the solvent being so delivered owing to the greater column of water or suitable liquid in the long limb $h$ and bend $h^2$ of the U shaped vessel. In this case the pump may cause the solvent to be delivered from the compression vessel into the short limb $h'$ by, for example, the pipe 12 and the delivery of solvent into this limb $h'$, will force the water back into and up the long limb $h$. The actual form of the reservoir would be designed to suit particular conditions.

I claim:

1. The process of extraction of grease from grease-laden material consisting in treating said material with solvent, distilling the grease laden solvent, condensing the distillates, sucking away gases or vapors and liquids which have been submitted to condensation, delivering said gases or vapors and liquids to a space in which said gases or vapors are submitted to compression for deposition of condensable matter, and delivering the condensed liquids from said space to a reservoir substantially as set forth.

2. The process of extraction of grease from grease-laden material consisting in treating said material with solvent, distilling the grease-laden solvent, condensing the distillates, sucking away gases or vapors and liquids which have been submitted to condensation, delivering said gases or vapors and liquids to a space in which said gases or vapors are submitted to compression for deposition of condensable matter, delivering condensed liquids from said space to a reservoir by pressure of said gases or vapors, and permitting uncondensed gases or vapors to escape from said space at a predetermined pressure substantially as set forth.

3. The process of extraction of grease from grease-laden material consisting in treating said material with solvent, distilling the grease-laden solvent, condensing the distillates, sucking away gases or vapors and liquids which have been submitted to condensation, delivering said gases or vapors and liquids to a space in which said gases or vapors are submitted to compression for deposition of condensable matter, delivering condensed liquids from said space to a reservoir by one path under the action of the pressure of said gases or vapors, and delivering uncondensed gases or vapors at a certain pressure to a gas space above liquids in said reservoir, substantially as set forth.

4. The process of extraction of grease from grease-laden material consisting in treating said material with solvent, distilling the grease-laden solvent, condensing the distillates, sucking away gases or vapors and liquids which have been submitted to condensation, delivering said gases or vapors and liquids to a space in which said gases or vapors are submitted to compression for deposition of condensable matter, delivering condensed liquids from said space to a reservoir by pressure of said gases or vapors, and scrubbing gases or vapors escaping from said space, substantially as set forth.

5. The process of extraction of grease from grease-laden material consisting in treating said material with solvent, distilling the grease-laden solvent, condensing the distillates, sucking away gases or vapors and liquids which have been submitted to condensation, delivering said gases or vapors and liquids to a space in which said gases or vapors are submitted to compression for deposition of condensable matter, automatically delivering all liquids above a predetermined level from said space to a reservoir by pressure of said gases or vapors, and delivering uncondensed gases or vapors from said space at a predetermined pressure substantially as set forth.

6. The process of extraction of grease from grease-laden material consisting in treating said material with solvent, distilling the grease-laden solvent, condensing the distillates, sucking away gases or vapors and liquids which have been submitted to condensation, delivering said gases or vapors and liquids to a space in which said gases or vapors are submitted to compression for deposition of condensable matter, delivering condensed liquids from said space to a reservoir by one path under the action of the pressure of said gases or vapors, delivering uncondensed gases or vapors at a certain pressure to a gas space above liquids in said reservoir, and scrubbing uncondensed gases or vapors escaping from said gas space at a predetermined pressure, substantially as set forth.

7. The process of extraction of grease from grease-laden material consisting in treating said material with solvent, distilling the grease-laden solvent, condensing the distillates, sucking away gases or vapors and liquids which have been submitted to condensation, delivering said gases or vapors and liquids to a space in which said gases or vapors are submitted to compression for deposition of condensable matter, delivering condensed liquids from said space to a reservoir by pressure of said gases or vapors, scrubbing gases or vapors escaping from said space in a scrubbing liquid, admitting liquid from said reservoir to the body of said scrubbing liquid, and admitting scrubbing liquid from said body to said condenser, substantially as set forth.

CHARLES ROBERT MAYO.

Witnesses:

W. MORBEY,

H. D. JAMESON.